Figure 1:
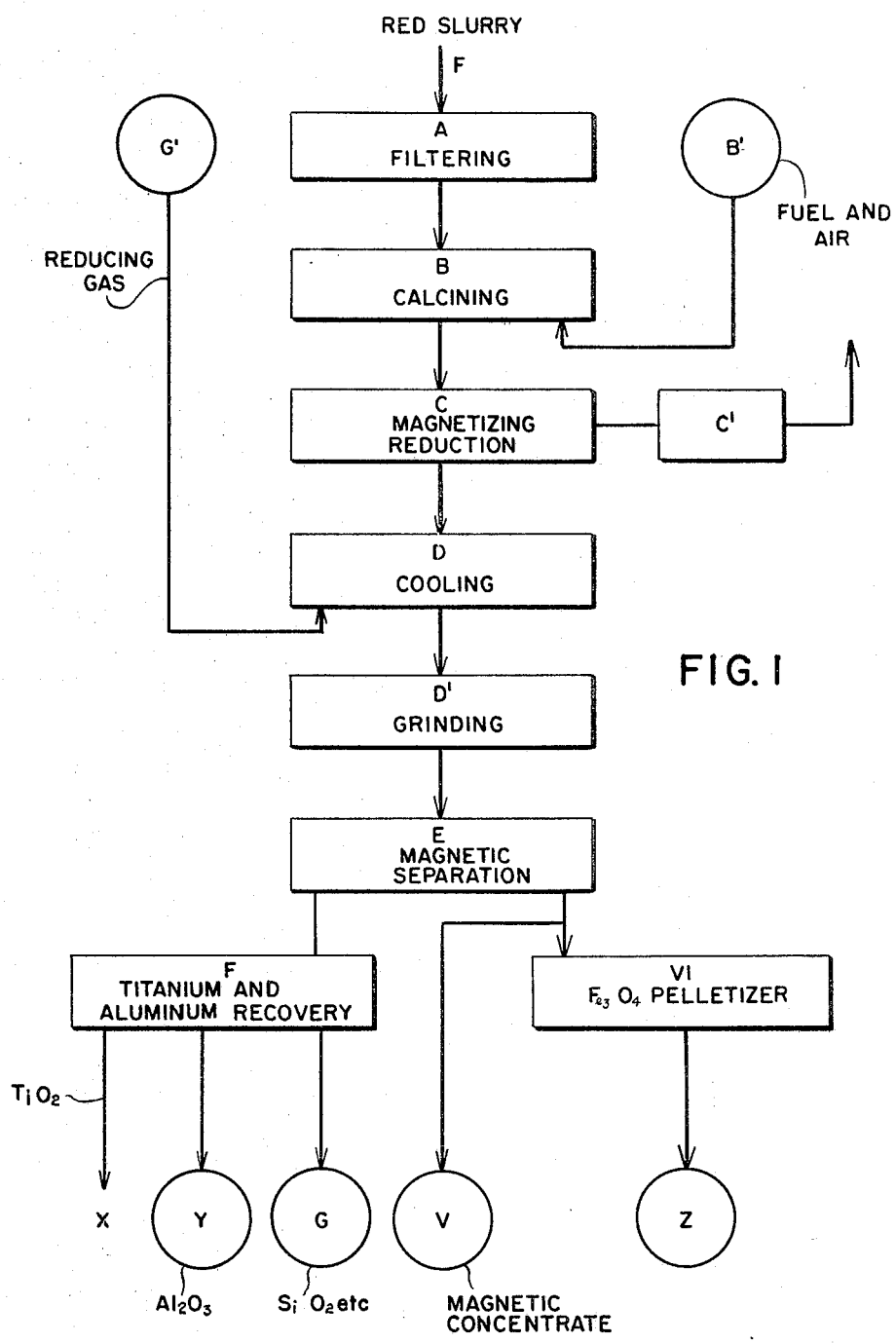

FIG. I

3,295,924
PROCESS FOR RECOVERING IRON, TITANIUM AND ALUMINUM FROM THE RED SLURRIES OBTAINED IN PROCESSING BAUXITE BY THE BAYER PROCESS
Umberto P. Colombo, Novara, Italy, assignor to Montecatini Societa Generale per l'Industria Mineraria e Chimica, Milan, Italy, a corporation of Italy
Filed Oct. 22, 1962, Ser. No. 232,218
Claims priority, application Italy, Oct. 24, 1961, 19,253/61
14 Claims. (Cl. 23—143)

This invention relates to an improvement in the art of recovering iron, titanium, and aluminum from "red muds" obtained as byproducts of the Bayer process, in which process calcined bauxite is digested with caustic soda solution under pressure, giving a solution of sodium aluminate, and leaving a residue of metal oxides, principally oxides of iron, which residue is ordinarily considered technologically useless.

The muds or slurries consist of an aqueous suspension of metal oxides, among which ferric oxide predominates, more or less hydrated. The water content of red slurries, as they are removed from the operating cycle of the Bayer process, is of the order of 40–50%.

The average composition of such red slurries, referred to the dried product, is as follows:

|  | Percent |
|---|---|
| $Fe_2O_3$ | 45–55 |
| $Al_2O_3$ | 12–22 |
| $TiO_2$ | 5–8 |
| $SiO_2$ | 5–10 |
| $Na_2O$ | 4–9 |
| $CO_2$ | 2–4 | together with a low concentration of gallium, vanadium, manganese, chromium, and other elements in minor concentrations.

If it is considered that the amount of red slurries available is very great, being approximately equal to that of alumina produced by the Bayer process, one readily understands why the problem of the recovery of iron, titanium and aluminum from red slurries of bauxite has excited the interest of researchers all over the world, for decades.

The colloidal nature and chemical composition of red muds or slurries make it non-feasible to treat them by wet processes of the ore-dressing type, i.e. flotation, or of a chemical type, i.e. selective precipitation, acid attack, etc. All the processes heretofore proposed for the recovery of the main metals from red slurries which were based on wet treatments have therefore been abandoned.

This negative result was in large measure attributable to the problems involved in effecting the wet chemical separation of iron from titanium and aluminum.

On the other hand, the high water content of the red slurries has always interfered with the development of thermal methods for the treatments of the slurries, because the cost of the fuel required for evaporating water from the slurries was considered excessively high, when compared with the relatively low value of the products obtained from red slurries. In spite of this disadvantage, technicians pursued dry processes in which the recovery of iron from red slurries was carried out after drying and calcining the same. Among such dry processes were those based upon drastic reduction of calcined red muds with coal or coke, to obtain pig irons, more or less titaniferous, which can be used in metallurgy. The chemical composition of these metallurgic products, and also their high cost of production, deriving from the need for operating the reduction to metallic iron at very high temperatures in rotary or shaft furnaces, caused the practical failure of the said processes.

Of the processes for utilizing the red muds or slurries, the one which found the most successful commercial application is based on the roasting of the slurries with limestone and sodium carbonate, followed by leaching the sintered product to recover sodium and aluminum oxides. The residue of this treatment, which residue contains practically all the iron of the red slurries, is used as a substitute for Portland cement. It is evident that this process is essentially intended to recover and utilize the residual aluminum contained in red slurries, but without trying to obtain valuable iron products useful in metallurgy.

In principle, the most useful method for recovering iron from red slurries of bauxite consists in transforming the hematite into magnetite, followed by magnetic separation of the latter from the other components of the slurries. A few years ago the investigator De Vecchis proposed a process based on the transformation of $Fe_2O_3$ into $Fe_3O_4$ by roasting the slurries in the presence of air in a rotary furnace at 845° C., followed by quenching the roasted product in water, so as to stabilize the magnetite formed by thermal dissociation of hematite at high temperature. This process, which excited considerable interest when it was proposed, did not find corresponding practical application, due to the high cost of the high temperature calcination, and to the relatively low yield obtained in the magnetic separation of the product quenched in water. The low yield was probably caused by the fact that not all the iron present in the calcined slurries is in the magnetic form. Another significant limitation in this method is the need for carrying out the magnetic separation in wet separators, due to the prior quenching in water of the calcined slurries.

The interest in the magnetic separation of iron led also to the study of direct preliminary treatment of bauxite to obtain a true enrichment of the mineral in aluminum oxide, and to separate iron before the treatment of the ore by the Bayer process.

However, it was found that the calcination needed for carrying out the magnetizing reduction or iron in bauxite greatly complicates the subsequent processing of bauxite by the Bayer process, since it decreases its capability of being attacked by alkali. Also, the magnetic separation of $Fe_3O_4$ from the non-magnetic material was not efficient at the relatively low iron content of the ore.

In conclusion, none of the processes heretofore proposed for recovering iron from bauxite red slurries, or from bauxite itself, solved the problem in an economically convenient way. Therefore, bauxite red slurries are generally not yet utilized in practice. Thus, the disposal of bauxite red slurries remains one of the most serious problems in the aluminum industry. It is so serious that the production of alumina according to the Bayer process is often carried out in localities selected on the basis of ease of disposal of red slurries.

The main object of this invention is to provide a process by which it is possible to obtain from the red muds or slurries iron oxide having a very high concentration suitable for production of valuable pellets for use in metallurgy, and also to obtain aluminum and titanium oxides the recovery of which is made possible, and convenient, by the preliminary magnetic separation of iron. As byproduct, a siliceous material is obtained containing the other metal oxides present in red slurries, viz vanadium, molybdenum, chromium, etc., in concentrations about ten times as high as those of the same oxides in the red slurries.

The process according to the invention is characterized by the following operations:

(a) Preliminary filtration, and preferably natural evaporation of the red muds until a water content below 30% by weight is obtained;

(b) Calcination of the red slurries by using a hot gas obtained by combustion of a solid, liquid or gaseous fuel with air;

(c) Reduction of the still hot calcined red slurries with a reducing gas obtained by partial combustion, with air or oxygen, of a fuel in a fluidized-bed furnace, to transform ferric oxide $Fe_2O_3$ into magnetite $Fe_3O_4$;

(d) Cooling of the calcined and reduced red slurries, preferably coupled with a preheating of the gas used in the reduction, and then grinding;

(e) Magnetic separation of the material in wet or dry separators (depending on the type of cooling system and on the particle size distribution of the material) to obtain a magnetic fraction consisting of concentrated $Fe_3O_4$ suitable for producing high purity pellets for metallurgy;

(f) Recovery of aluminum and titanium oxides from the non-magnetic fraction thus obtained, by roasting with $Na_2CO_3$ and $CaCO_3$, leaching the aluminate thus formed, hydrolysis of the aluminate in a similar way as in the Bayer process, and acid attack preferably with sulfuric acid having a concentration above 50% of the leaching residue to solubilize the titanium dioxide;

(g) Recovery of oxides of vanadium, chromium, manganese and other metals from the residue remaining after recovery of $Al_2O_3$ and $TiO_2$.

According to a feature characterizing the invention, the roasting is carried out in a fluidized-bed furnace at 300°–750° C., and the reduction is effected in the same fluidized-bed furnace by means of a gas containing at least 20% of carbon monoxide and hydrogen at temperatures between 350° and 750° C. The grinding can be carried out under dry or wet conditions, and, correspondingly, the magnetic enrichment is carried out under either dry or wet conditions.

Figure 2:
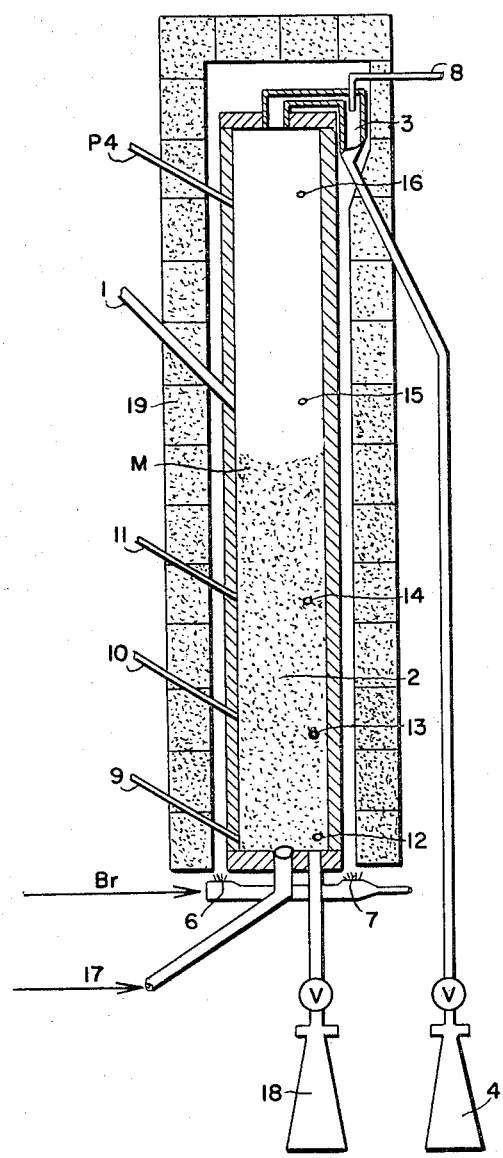

The invention will be described in reference to the accompanying drawing, in which FIG. 1 is a flow-sheet of the process, and FIG. 2 is a vertical section of a pilot furnace provided with a fluidized bed.

The process of treating bauxite red slurries according to the present invention is schematically illustrated in FIG. 1 of the accompanying drawing. The letters and Roman numbers in FIG. 1 have the following meaning:

F—red slurries
B'—fuel (oil or gas) plus air
G'—reducing gas
V—magnetic concentrate with an Fe content higher than 63%
Z—pellets containing more than 63% of Fe
X—$TiO_2$
Y—$Al_2O_3$
G—exhausted mass containing $SiO_2$ and other metal oxides which, if desired, can be recovered The operations of the process are:

A—filtration
B—calcination in a fluidized-bed furnace
C—magnetizing reduction in a fluidized-bed furnace
C'—heat recovery from the exhaust gases of the reaction
D—cooling of reduced ashes
D'—possible grinding of reduced ashes
E—magnetic separation of $Fe_3O_4$
VI—possible pelletizing of conc. $Fe_3O_4$
F—recovery of aluminum and titanium from the non-magnetic fraction.

The bauxite red muds, after drastic filtration at A, made more effective by addition of anionic flocculating agent, and possibly after natural evaporation of a part of the residual water, are roasted on a fluidized bed, in B, with a hot gas obtained by burning with air a liquid or gaseous fuel in the same fluidized bed, so as to obtain the highest thermal efficiency; the calcination, i.e. roasting, temperature is suitably regulated so as not to surpass 750° C. (operation B: calcination).

The calcined product, still at a high temperature, passes into a second fluidized bed (which in principle can also be a second stage of the same roasting furnace B) in which it is reduced by a reducing gas containing CO and $H_2$ obtained by partial combustion of solid, liquid or gaseous fuels, to transform hematite, $Fe_2O_3$, into magnetite, $Fe_3O_4$ (operation C: reduction).

The reducing gas is produced in a generator G, which is separate from the fluidized-bed furnace. This cold gas is sent to operation D where it meets the ashes in countercurrent, thus cooling the ashes, the gas being preheated up to the reduction temperature which is between 350° and 750° C.

The reducing gas can also be produced in the same fluidized-bed furnace in which the material to be roasted is treated. In this case the calcination can also be carried out under a reducing atmosphere, and the cooling of the reduced material can be carried out by quenching the same in water.

The product leaving the reduction step C and cooling step D is ground at D' to a size of about 0.2–0.05 mm., depending on the particle size distribution of iron oxide grains, and is then subjected to magnetic separation step E. Depending on whether the reduced material has been cooled in a gaseous current or quenched in water, and on the particle size distribution of the ground product, the magnetic separation is conveniently carried out under dry or wet conditions, thus obtaining a magnetic fraction consisting of $Fe_3O_4$ having an Fe content higher than 63–64% and a non-magnetic fraction consisting of a mixture of aluminum, titanium and silicon oxides, etc.

The magnetic fraction is of a quality suitable to the production of valuable pellets for use in metallurgy. The pellets are prepared in VI and are collected in Z. The non-magnetic fraction can be treated directly in operation F, by successive alkaline and acid attacks to obtain aluminum oxide collected in Y and titanium oxide collected in X.

The final residue after these treatments is a product consisting mostly of silica, but in which vanadium and the other "minor" elements are present in a concentration 10 times that in the starting red slurries. This residue can therefore be suitably treated to recover the minor components of higher interest (operation G).

The process of the present invention offers the following advantages:

(1) Convenient and economic recovery of iron from red slurries in the form of concentrated iron oxide suitable for obtaining pellets valuable in metallurgy.

(2) The feasibility of carrying out the calcination and magnetizing reduction in a single fluidized-bed furnace, in one or more stages, with an evident saving in the working costs and a better utilization of heat.

(3) The recovery of heat from the exhausted gases of the calcination and reduction operations, and the utilizing of this heat for the preliminary drying of the starting red slurries.

(4) The feasibility of recovery of the aluminum oxide present in the slurries after magnetic separation of iron oxide from the calcined and reduced product. This is made feasible due to the use of fluidized bed furnaces, for the roasting and reduction, which can be operated at sufficiently low temperatures so as not to cause the insolubilization of aluminum oxide, and thereby not reducing the effectiveness of the attack by alkaline solutions.

(5) The new process makes it possible to recover titanium dioxide, present in red slurries, by acid attack, after recovery of aluminum from the non-magnetic fraction obtained after reduction of the calcined slurries.

(6) The new process makes it possible to recover, in an economical and technically satisfactory way, the "minor" elements contained in red slurries, such as vanadium, manganese and chromium, from the siliceous material obtained as a residue after the integral recovery of Fe, Al and Ti.

The invention will now be described with reference to the following preferred embodiments, which are not intended to be limitative.

EXAMPLE 1

200 kg. of red slurries, obtained by treatment of Gargano bauxite according to the Bayer process, are used.

The red slurries, after preliminary natural evaporation, have the following composition:

| | Percent |
|---|---|
| $H_2O$ | 26 |
| $Fe_2O_3$ | *52.6 |
| $Al_2O_3$ | *14.8 |
| $TiO_2$ | *7.3 |
| $SiO_2$ | *9.8 |
| $Na_2O$ | *6.7 |
| $CO_2$ | *2.5 |

*Calculated on the basis of the dry product.

and also small amounts of vanadium, manganese and chromium oxide, etc.

The material M is continuously introduced by feeder 1 (e.g., an extrusion feeder) into the pilot furnace of FIG. 2, which is provided with a fluidized bed 2, having an inner diameter of 5 inches and a height of 3 meters. The furnace is also provided with a cyclone separator 3.

Feeder 1 is regulated at a flow rate of 0.5 kg. per minute. The material M is calcined with hot air (calcination temperature=650° C.) as fluidizing gas. Air passes up through the bottom of the furnace at a rate of 5–6 cubic meters per hour. The temperature inside the furnace is kept constant, in spite of the relatively high surface to volume ratio, by externally heating the furnace using burners 6 and 7.

In an industrial reactor it is not necessary to supply heat to the furnace because the entering gases are already at a sufficiently high temperature to react with the solid material.

The product is recovered below from the bed, and also from the cyclone separator at 4. Gases are vented through pipe 8.

The furance is provided with the usual chimney. The pipes 9–10–11 and P4 are pressure gauges used for measuring the pressure of the gas inside the furnace. Thermocouples are indicated at 12–13–14–15–16. The refractory furnace wall is shown at 19.

The ground product has the following granulometry:

| Diameter, mm.: | Percent by weight |
|---|---|
| >10.00 | — |
| 10.0 to 3.70 | 10.1 |
| 3.70 to 1.38 | 30.5 |
| 1.38 to 0.71 | 26.2 |
| 0.71 to 0.20 | 15.0 |
| 0.20 to 0.10 | 9.2 |
| 0.10 to 0.05 | 7.2 |
| <0.05 | 2.8 |

The red slurries thus calcined are again treated in the fluidized bed reactor to carry out the magnetizing reduction. The feed is regulated by a rotating-plate distributor (not shown) actuated by a hydraulic speed variator (not shown). The flow-rate is regulated to feed the furnace with 0.6 kg./minute of calcined red slurries. The magnetizing reduction is carried out at the temperature of 600° or 650° C. with a reducing gas introduced at 17, containing 20–30% of $CO+H_2$, sent to the bottom of the furnace and passed upwardly through material M. Again the temperature inside the furnace is kept constant by externally heating same furnace by means of burners 6 and 7. The operation is carried out with an excess of reducing agent of 10 to 40% in respect to the stoichiometric amount needed for transforming hematite into magnetite. The reduced red slurries are discharged from the bed and from the cyclone into vessel 17 and are cooled under nitrogen. After grinding the reduced product it is subjected to dry magnetic enriching in dry separators of the Mörstsell-Sala type. A magnetic fraction and a non-magnetic fraction are thus obtained. The magnetic concentrate has an iron content higher than 63%, and is used for preparing pellets for application in metallurgy. The recovery of iron in the magnetic separation is higher than 93%.

The non-magnetic fraction is utilized as follows for recovering $Al_2O_3$, $TiO_2$ (16%), and also the other minor elements, if desired.

After suitable roasting treatment with 10 kgs. of $Na_2CO_3$ and 14 kgs. of $CaCO_3$, aluminum is recovered in the form of sodium aluminate by a leaching performed with an aqueous alkaline solution having a pH above 10. Leaching is followed by hydrolysis of sodium aluminate. This hydrolysis is conveniently achieved by dilution with fresh water, in a similar fashion as in the Bayer process.

After elimination of aluminum, titanium is recovered by attack with sulfuric acid of approximately 66 Bé. density at a temperature above 80° C., which leads to be the formation of a titanium (or titanyle) sulfate solution. Titanium dioxide is obtained by high temperature hydrolysis of this solution (t.>100° C.), after possible dilution with fresh water. The exhausted residue, prevailingly consisting of silica, can be used for recovering the minor elements.

EXAMPLE 2

50 kg. of red slurries having the same composition as that reported in Example 1 are used. The material is introduced into the pilot fluidized-bed furnace by means of an extrusion feeder in an amount of 0.5 kg./minute.

A hot reducing gas is introduced into the furnace which makes it possible to carry out the calcination and reduction in a single operation. The calcination and reduction temperature is between 600° and 650° C. The reducing gas is used in excess of 10 to 30% in respect to the stoichiometric amount needed for transforming hematite into magnetite.

The reduced product is discharged from the bed and from the cyclone and is quenched in water. It is then subjected to wet magnetic separation. A magnetic concentrate having an iron content greater than 63% is obtained with a recovery of 92–94%. This concentrate is used in the preparation of pellets for metallurgy.

Aluminum, titanium and the minor elements are recovered from the non-magnetic fraction as described in Example 1.

I claim:
1. A process for the treatment of red slurry obtained as residue in the processing of bauxite by the Bayer process, to obtain iron oxide and to recover titanium oxide, and aluminum oxide present in the slurry, comprising the following operations:
 (a) preliminary separation of water to provide a water content below 30% by weight;
 (b) calcination in a fluidized bed furnace at a temperature between 300° and 750° C.;
 (c) reduction of the still hot calcined material with a reducing gas containing at least 20% carbon monoxide and hydrogen and obtained by partial combustion of a fuel, the reduction being carried out in a fluidized-bed furnace, to transform ferric oxide $Fe_2O_3$ into magnetite $Fe_3O_4$;
 (d) cooling the calcined and reduced red slurry;
 (e) magnetic separation of the material to obtain a magnetic fraction consisting of concentrated $Fe_3O_4$;

(f) recovery of aluminum and titanium oxides from the non-magnetic fraction thus obtained by roasting with $Na_2CO_3$ and $CaCO_3$, leaching to solubilize the aluminate thus formed, separating the aluminate solution from the residue, hydrolysis of the aluminate solution according to the Bayer process to recover aluminum oxide and acid attack of the residue, thus solubilizing titanum dioxide and separating the solubilized titanium dioxide.

2. A process according to claim 1, in which roasted material is recovered from gases vented from the operation by cyclonic separation and is mixed with roasted material coming from the bed of the furnace before its introduction into the reducing furnace.

3. A process according to claim 1, in which roasted material is recovered by cyclonic separation, the recovered material having a finer granulometry than the material coming from the bed of the roasting furnace, and being reduced in separate fluidized bed furnace suitable for the fine materials.

4. A process according to claim 1, characterized in that the temperature in the reduction zone of the reduction furnace is kept at between 350° and 750° C.

5. A process according to claim 1, characterized in that the required reducing gas is produced in the reduction furnace by direct introduction of fuel and air or oxygen into the furnace.

6. A process according to claim 1, in which the exhausted reduction gas is burnt with heat recovery and is used for drying and calcining the starting red slurry.

7. A process according to claim 1, characterized in that the required reducing gas is produced in a burner separate from the furnace and is then cooled and introduced into the lower part of the same furnace in which it exchanges heat with the reduced material and cools it to a temperature lower than 300° C.

8. A process according to claim 1, characterized in that the reduced material is cooled by quenching in water.

9. A process according to claim 1, characterized in that the reduced material, after cooling, is subjected to grinding in a dry mill to a size of 0.20–0.05 mm.

10. A process according to claim 1, characterized in that the reduced material, after cooling, is subjected to grinding in a wet mill to a size of 0.20–0.05 mm.

11. A process according to claim 9, characterized in that the reduced and cooled product, after dry grinding, is subjected to a dry magnetic enrichment.

12. A process according to claim 10, characterized in that the reduced and cooled product, after wet grinding, is subjected to wet magnetic enrichment.

13. A process according to claim 10, characterized in that the non-magnetic fraction is roasted in the presence of $Na_2CO_3$ and $CaCO_3$ and after cooling is subjected to a leaching of alkali aluminate at a pH above 10.

14. A process according to claim 1, in which the reduced product is subjected to grinding and then to magnetic separation, the non-magnetic fraction, after elimination of aluminum, treated with concentrated sulfuric acid ($H_2SO>50\%$) to solubilize titanium, and the titanium sulfate is hydrolyzed to produce a hydrated titanium dioxide precipitate, which is thereafter recovered.

References Cited by the Examiner
UNITED STATES PATENTS

| | | | |
|---|---|---|---|
| 1,865,869 | 7/1932 | Luyken. | |
| 2,375,342 | 5/1945 | Brown | 23—141 |
| 2,637,628 | 5/1953 | DeVecchis et al. | 23—141 |
| 2,964,383 | 12/1960 | Kamlet | 23—143 |
| 3,194,757 | 7/1965 | Sullivan | 23—141 X |
| 3,198,622 | 8/1965 | Herzog et al. | 71—1 |

OSCAR R. VERTIZ, *Primary Examiner.*

H. T. CARTER, *Assistant Examiner.*